US008549240B2

(12) United States Patent
Sharma et al.

(10) Patent No.: US 8,549,240 B2
(45) Date of Patent: Oct. 1, 2013

(54) APPARATUS AND METHODS FOR AN APPLIANCE TO RECOVER DATA FROM A STORAGE DEVICE

(75) Inventors: Samar Sharma, San Jose, CA (US); Roy M. D'Cruz, Sunnyvale, CA (US); Sanjaya Kumar, Fremont, CA (US); Jhaanaki M. Krishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1781 days.

(21) Appl. No.: 11/356,857

(22) Filed: Feb. 16, 2006

(65) Prior Publication Data

US 2007/0220310 A1    Sep. 20, 2007

(51) Int. Cl.
*G06F 12/00* (2006.01)
*G06F 13/00* (2006.01)
*G06F 13/28* (2006.01)

(52) U.S. Cl.
USPC .......................................... 711/162; 711/161

(58) Field of Classification Search
None
See application file for complete search history.

(56) References Cited

U.S. PATENT DOCUMENTS

| | | | |
|---|---|---|---|
| 6,182,197 B1 | 1/2001 | Dias et al. | |
| 6,681,310 B1 | 1/2004 | Kusters et al. | |
| 7,003,780 B2 | 2/2006 | Peloquin et al. | |
| 7,072,894 B2 | 7/2006 | Loy et al. | |
| 7,356,573 B2 * | 4/2008 | Sharma et al. | 709/218 |
| 2002/0191649 A1 * | 12/2002 | Woodring | 370/906 |
| 2005/0033878 A1 | 2/2005 | Pangal et al. | |
| 2005/0172097 A1 * | 8/2005 | Voigt et al. | 711/170 |
| 2006/0010227 A1 | 1/2006 | Atluri | |
| 2006/0013222 A1 * | 1/2006 | Rangan et al. | 370/389 |
| 2007/0011276 A1 | 1/2007 | Sharma et al. | |

OTHER PUBLICATIONS

EMC2 and Fujitsu Siemens Computers, Global Recovery Demonstration: SRDF/A and Primecluster-EMC Remote Data Facility/Asynchronous Fujitsu Siemens Computers Primecluster, Feb. 2004, pp. 1-26.
EMC2, EMC SRDF Family, Powerful remote replication solutions improve organizational productivity, enhance online business continuity, Sep. 2004.
International Search Report dated Sep. 29, 2008 from corresponding PCT Application No. PCT/US07/62024.

* cited by examiner

*Primary Examiner* — Yaima Campos
(74) *Attorney, Agent, or Firm* — Weaver Austin Villeneuve & Sampson LLP

(57) ABSTRACT

Disclosed is a data recovery mechanism associated with a data writing process in a storage area network (SAN). In general, a data writing mechanism is provided so that a particular host can write data to a storage device in a particular SAN session. One specific example of a data writing mechanism is a data tapping mechanism that provides a copy of this data to an appliance. The data recovery mechanism allows the appliance to recover data from the particular target, for example, when the data was unsuccessfully mirrored to the appliance during the data tapping or when the appliance needs to obtain the data that was written prior to a data tapping procedure being initiated. In one embodiment, the data recovery mechanism is set up so that the appliance can recover data from the target by mimicking the particular host.

26 Claims, 11 Drawing Sheets

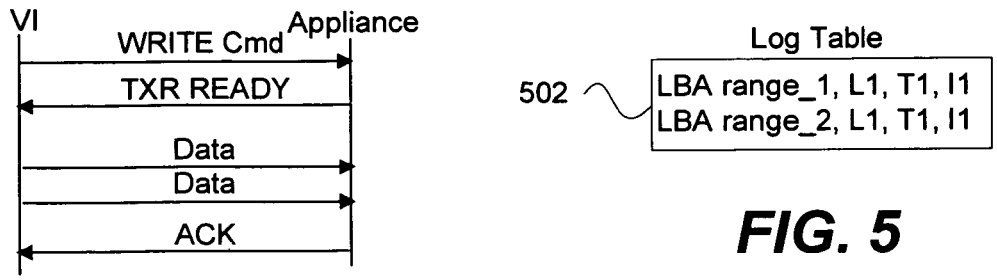
*FIG. 4*
*FIG. 5*
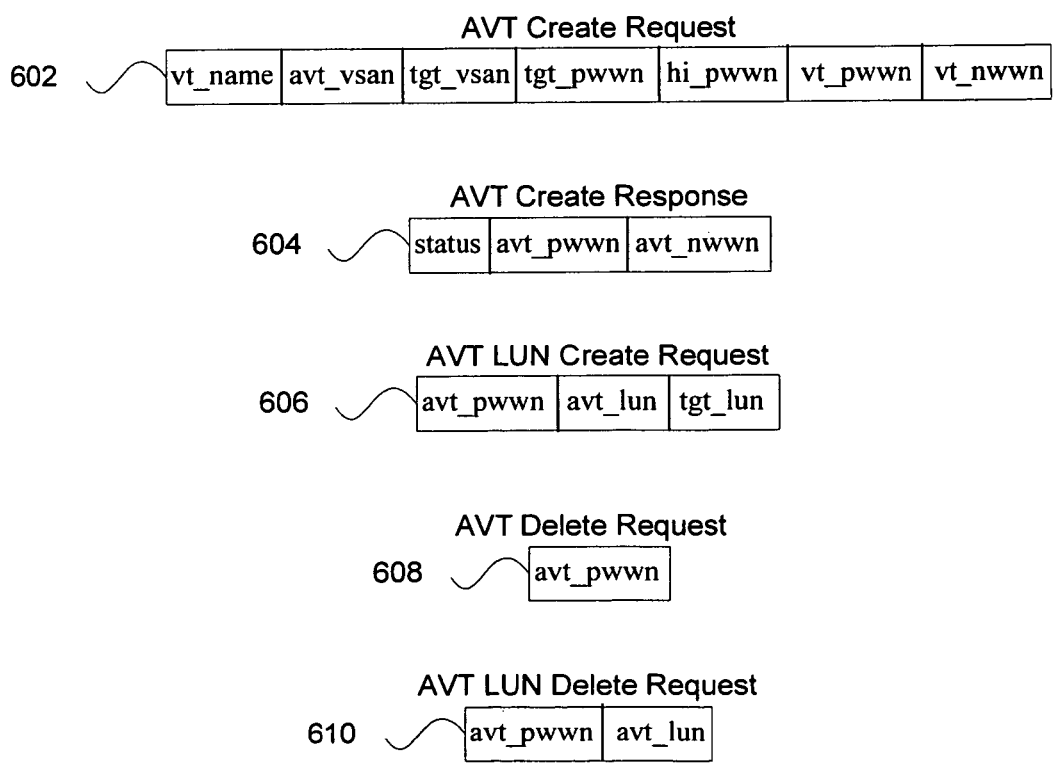
*FIG. 6*

APPARATUS AND METHODS FOR AN APPLIANCE TO RECOVER DATA FROM A STORAGE DEVICE

BACKGROUND OF THE INVENTION

The present invention relates to storage area networks. More particularly, the present invention relates to methods and apparatus for facilitating intelligent services with respect to data flowing between a host and a storage device, or the like.

In recent years, the capacity of storage devices has not increased as fast as the demand for storage. Additionally, a host may wish to use multiple storage devices because it needs tiered and heterogeneous storage or because storage management facilities are needed for reasons specific to the storage environment. For example, it may be desirable to use database tables on a fast storage device, and other tables on a slower or less expensive storage device.

In order to solve these storage limitations, the storage area network (SAN) was developed. Generally, a storage area network is a high-speed special-purpose network that interconnects different data storage devices and associated data hosts on behalf of a larger network of users.

Recently, mechanisms for tapping data flows within a SAN have been provided so as to facilitate applications that could use such tapped data, such as continuous backup, traffic analysis, or remote replication applications. Several embodiments of a data tapping system are further described in co-pending U.S. patent application Ser. No. 11/177,880, filed 8 Jul. 2005 by Samar Sharma et al., which application is incorporated herein by reference in its entirety for all purposes. In general, mechanisms are provided in a SAN to tap data flowing between a host and a storage device. In one implementation, data sent by a specific host to a specific storage device is intercepted. The intercepted data or a copy of such data is then sent to both the specific storage device and to an appliance.

Although the basic data tapping scheme advantageously provides a new and useful service with respect to a SAN, there are continuing efforts to provide improvements of such a data tapping scheme.

SUMMARY OF THE INVENTION

The present invention provides a data recovery mechanism associated with a data writing process in a storage area network (SAN). In general, a data writing mechanism is provided so that a particular host can write data to a storage device in a particular SAN session. One specific example of a data writing mechanism is a data tapping mechanism that provides a copy of this data to an appliance. The data recovery mechanism allows the appliance to recover data from the particular target, for example, when the data was unsuccessfully mirrored to the appliance during the data tapping or when the appliance needs to obtain the data that was written prior to a data tapping procedure being initiated. In one embodiment, the data recovery mechanism is set up so that the appliance can recover data from the target by mimicking the particular host.

In one embodiment, a method of recovering data from a data writing process in a storage area network (SAN) is disclosed. A first data writing mechanism is provided for a first host to write first SAN data to a storage device. A first data recovery mechanism that is associated with the first data writing mechanism is set up whereby the first data recovery mechanism allows the appliance to recover the first SAN data from the storage device.

In a specific implementation, setting up the first data recovery mechanism is accomplished by (a) setting up a first appliance virtual target (AVT) for reading the first SAN data from the target, wherein the first AVT is set up in a network device in the SAN that receives the first SAN data and (b) when the appliance sends a READ command to the first AVT for reading a first portion of the first SAN data, sending a READ command for reading the first portion of the first SAN data to the storage device and directing the first portion of the SAN data that is sent from the storage device to the appliance. In a further aspect, the first data writing mechanism provides a data virtual target (DVT) for receiving the first SAN data and a virtual initiator (VI) for sending the first SAN data that is received at the DVT to the storage device. A READ command for the first SAN data is sent from the VI to the storage device when a READ command for the first SAN data is received at the first AVT from the appliance. In yet another aspect, the READ command sent from the VI to the storage device includes a source field that specifies the first host as being the source of the READ command for the first SAN data.

In another embodiment, a second data writing mechanism is provided for a second host to write second SAN data to the storage device. A second data recovery mechanism that is associated with the second data writing mechanism is set up whereby the second data recovery mechanism allows the appliance to recover the second SAN data from the storage device. Setting up the second data recovery mechanism is accomplished by (i) setting up a second appliance virtual target (AVT) for reading the second SAN data from the target, wherein the second AVT is set up in a network device in the SAN that receives the second SAN data and (ii) when the appliance sends a READ command to the second AVT for reading a first portion of the second SAN data, sending a READ command for reading the first portion of the second SAN data to the storage device and directing the first portion of the second SAN data that is sent from the storage device to the appliance. In a further aspect, the second data writing mechanism provides a second data virtual target (DVT) for receiving the second SAN data and a second virtual initiator (VI) for sending the second SAN data that is received at the second DVT to the storage device, and a READ command for the second SAN data is sent from the second VI to the storage device when a READ command for the second SAN data is received at the second AVT from the appliance. In yet another implementation, the READ command sent from the second VI to the storage device includes a source field that specifies the second host as being the source of the READ command for the second SAN data. The first portion of the first SAN data may be a different logical unit of the storage device than the first portion of the second SAN data.

In another implementation, setting up the first recovery mechanism includes (i) assigning a port and device world wide name (PWWN and NWWN) to the AVT, and (ii) forming and storing an AVT data structure to relate an FV and NV port of the first AVT, the PWWN and NWWN of the first AVT, and VSAN of the first AVT whereby an fibre channel identifier (FCID) is assigned and related to the PWWN and NWWN of the first AVT. In a further aspect, a response having the PWWN and NWWN of the first AVT is sent to the appliance. In another feature, setting up the first recovery mechanism further includes (v) registering the first AVT with a name server database. In yet another embodiment, a READ command sent to the first AVT uses the FCID of the first AVT as a source and a READ command sent to the storage device in response to a READ command to the first AVT includes an FCID for the first host. In a further aspect, the first data writing mechanism includes logging errors for the first SAN data being received by the appliance, the method further comprising sending the logged errors for the first SAN data to the appliance.

In another implementation, setting up the first data recovery mechanism is triggered by a request from the appliance identifying the target and the first host. In yet an alternative feature, setting up the first data recovery mechanism is only performed when the identified target is valid. In a specific implementation, setting up the first recovery mechanism further includes (iii) receiving a request to set up a LUN for the first AVT that corresponds to a specified LUN of the target and (iv) forming and storing an AVT LUN data structure to relate the specified LUN of the AVT and the specified LUN of the target to the first AVT. In one aspect, the storage device is a real storage device, and in another aspect, the storage device is a virtual storage device.

In another embodiment, the invention pertains to an apparatus operable to recover data from a data writing process in a storage area network (SAN). The apparatus includes one or more processors and one or more memory. At least one of the memory and processors are adapted to provide at least some of the above described method operations.

In an alternative embodiment, the invention pertains to a system for recovering data from a data tapping process in a storage area network (SAN). The system includes a first host, a storage device for storing data, and an appliance for tapping data in the SAN. The system further includes a network device in the SAN operable to (i) provide a first data tapping mechanism for the appliance to receive first SAN data that is being sent from the first host to the storage device and (ii) set up a first data recovery mechanism that is associated with the first data tapping mechanism whereby the first data recovery mechanism allows the appliance to recover the first SAN data from the storage device. The appliance is configured to recover one or more portions of the first SAN data when the one or more portions are unsuccessfully received by the appliance.

These and other features and advantages of the present invention will be presented in more detail in the following specification of the invention and the accompanying figures which illustrate by way of example the principles of the invention.

BRIEF DESCRIPTION OF THE DRAWINGS

FIG. 4 is a communication diagram illustrating a handshaking process for writing data between a virtual initiator (VI) and an appliance.

FIG. 5 illustrates an Error Log Table in accordance with one implementation of the present invention.

FIG. 6 includes a number of message types for creation and use of an AVT in accordance with one embodiment of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
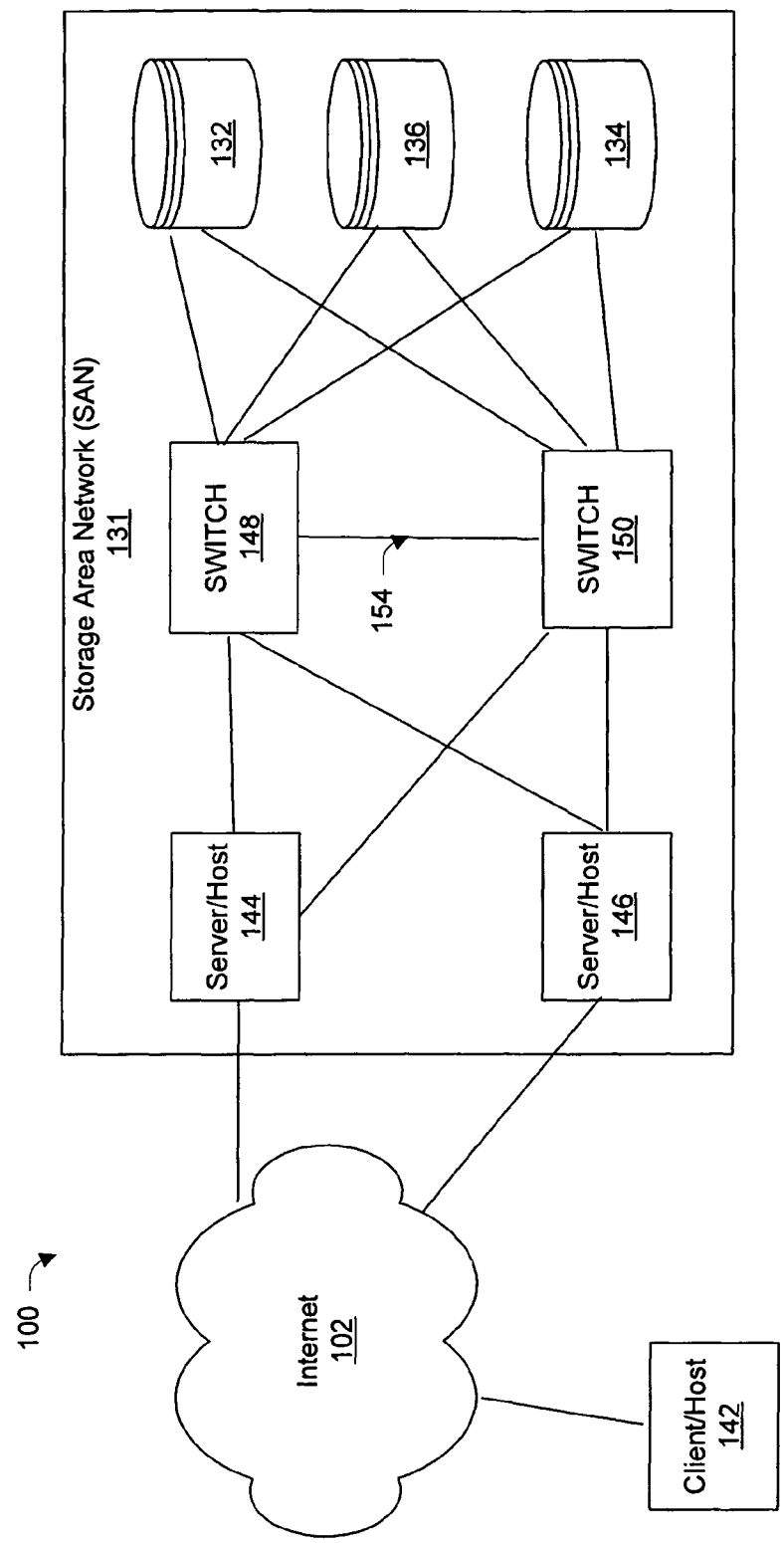
FIG. 1 is a block diagram illustrating an exemplary storage area network in which various embodiments of the invention may be implemented.

FIG. 1 is a block diagram illustrating an exemplary network 100 in which various embodiments of the invention may be implemented. As shown, network 100 includes a storage area network (SAN) 131, such as a bank's financial data center, for handling requests for data as initiated by any suitable type of entity, such as a customer's host or client computer 142. Of course, a plurality of hosts/clients (not shown) typically would be able to access such a SAN 131. In current networks, the client 142 typically sends requests to SAN 131 via a wide area network, such as the Internet 102. The SAN 131 may also implement virtualization, and such a network may be referred to as a virtual storage area network (VSAN). Virtualization generally refers to the use of software entities to represent one or more physical entities. For example, a virtual port (e.g., of a switch) may represent two physical ports (e.g., of the switch). However, so as to simplify this initial description, only a SAN without virtualization will be described although embodiments of the present invention include at least some virtualized entities in the SAN.

In a SAN, data may be read from, as well as written to, various portions of a plurality of storage devices (e.g., 132, 134, and 136) within SAN 131 in response to commands sent by client 142 to one or more servers or hosts, e.g., 144 and 146, of SAN 131. In general, the data may be accessed by any number of hosts or clients although not illustrated in FIG. 1. Communication among the storage devices and hosts is accomplished by coupling the storage devices and hosts together via one or more switches, routers, or other network nodes configured to perform switching functions. In this example, switches 148 and 150 may also communicate with one another via an interswitch link 154.

Although the network devices described above with reference to FIG. 1 are described as switches, the present invention may be practiced with respect to any suitable type of network device. Thus, other network devices such as routers may be implemented to receive, process, modify and/or generate packets or frames with functionality such as that described herein for transmission in a storage area network. Moreover, the network devices described herein are merely illustrative, and therefore other configurations of a network device may be utilized to implement the disclosed inventive embodiments.

In some of the discussion herein, the functions of switches of this invention are described in terms of the SCSI protocol. This is because many storage area networks in commerce run a SCSI protocol to access storage sites. However, the present invention may be implemented using any suitable device connectivity protocol, besides SCSI. Currently, storage area networks also employ the Fibre Channel (FC) protocol (FC-PH (ANSI X3.230-1994, Fibre Channel—Physical and Signaling Interface) as a lower level protocol and runs IP (Internet Protocol) and SCSI on top of Fibre Channel. Note that the invention is not limited to any of these protocols and may be applied to any protocol, such as FC, iSCSI, FCIP, iFCP, Eternet, FV, etc. The implemented protocols may also include any permutation of SCSI, such as SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the described procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a virtual or physical device that performs an operation requested by an initiator. For example, a target physical or virtual memory disk will obtain or write data as initially requested by a host initiator. Note that while the host initiator may provide instructions to READ from or WRITE to a "virtual" target having a virtual address, a fabric switch (or some other mechanism) first converts those instructions to a physical target address before instructing the target.

Figure 2:
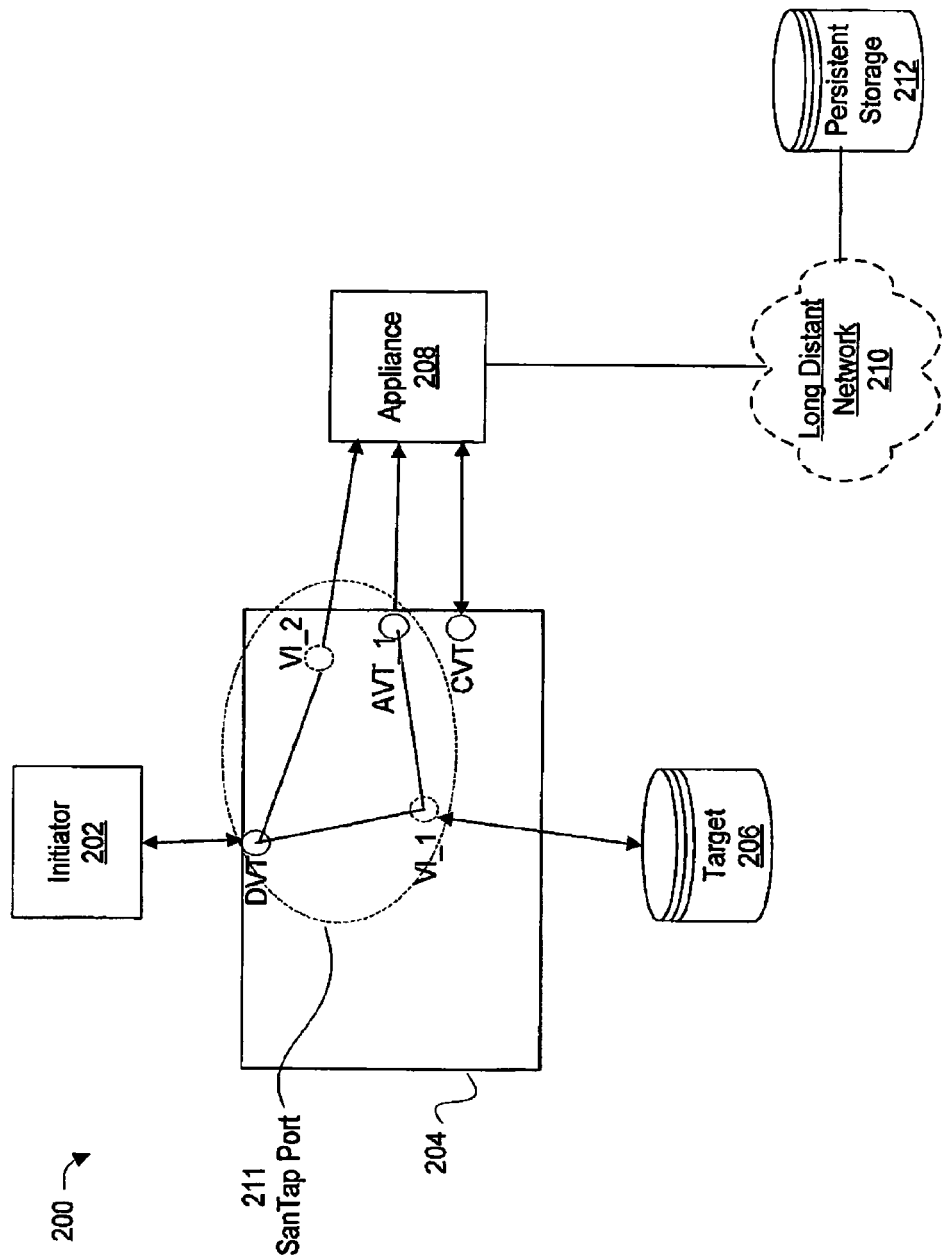
FIG. 2 is a diagrammatic representation of a network segment that illustrates an appliance virtual target for implementing data tapping synchronization in accordance with one embodiment of the present invention.

FIG. 2 is a diagrammatic representation of a network segment 200 that includes an appliance 208 for tapping one or more SAN or VSAN data sessions or flows between an initiator 202 and a target 206 in accordance with one embodiment of the present invention. Of course, any number of appliances may tap data from one or more sessions between any number of initiator and target pairs. As shown, the initiator 202 accesses (e.g., READ or WRITE) target 206 via switch 204. Typically, a pair of redundant switches (not shown) are used in the event of failure of a one of the switches. Also, SCSI targets, such as storage disks or physical logic units (PLUNs), are directly accessible by SCSI initiators (e.g., hosts). Similarly, even when VLUNs (virtual logical units) are implemented, the VLUNs are visible and accessible to the SCSI initiators. Thus, each initiator will typically identify those PLUNs or VLUNs that are available to it. More specifically, the initiator typically determines which SCSI target ports are available to it. The initiator may then ask each of those SCSI target ports which PLUNs or VLUNs are available via those SCSI target ports. The procedures for an initiator to identify the target ports and LUNs available to it generally include various handshaking procedures for querying the switch and ports for such information.

As shown, appliance 208 is coupled to switch 204, and such switch 204 is configured or set up to allow the appliance access to data flowing between initiator 202 and target 206. Appliances generally may be configured to store SAN or VSAN data in persistent memory (e.g., 212) for various applications without disrupting the flow in the SAN or VSAN. In one application, data written from the initiator to the target is replicated on a remote site by the appliance. For example, appliance 208 replicates data being sent from initiator 202 to target 206 and this replicated data is sent to a remote persistent storage 212 via an optional long distance network 210. In another application, data I/O between an initiator and target is tracked for each increment of time so that logs of I/O for discrete periods of time are retained for later use. This retained data I/O can then be retrieved for a particular time period, for example, to recover data that was lost for such period of time. The retrieved data may also be analyzed over specific periods of time for various purposes.

Such a data tapping scheme is referred to herein as "SANTap." Generally, SANTap allows an appliance to tap into the SAN or VSAN data flow for various applications. In other words, embodiments of SANTap serve as enablers of appliance applications that require copies of SAN or VSAN data. Any suitable mechanism may be used to allow an appliance to tap the data I/O between an initiator and target.

In one implementation, a software entity for handling the data tap is configured or set up in the switch. This software entity may include one or more data virtual target (DVT) and virtual initiator (VI) pairs. In one implementation, the appliance causes one or more DVT and VI pairs to be set up in a switch as needed. Several mechanisms for forming and handling virtual targets and virtual initiators are described further in "Cisco MDS 9000 Family Configuration Guide, Cisco MDS SAN-OS Release 1.1(1a)", Cisco Systems, Inc., January 2004 and co-pending U.S. patent application Ser. No. 10/056,238, entitled METHODS AND APPARATUS FOR IMPLEMENTING VIRTUALIZATION OF STORAGE WITHIN A STORAGE AREA NETWORK, filed 23 Jan. 2002 by Thomas James Edsall et al. This document and patent application are incorporated herein by reference in their entirety for all purposes.

As shown in the example implementation of FIG. 2, a DVT is set up between initiator 202 and target 206. The target and/or initiator may be virtual or real, physical devices. The DVT is configured to intercept data I/O sent from the initiator 202 to the target 206. The intercepted data is then mirrored from one or two virtual initiator (VI) entities, e.g., VI_1 and VI_2 in the illustrated example. Entity VI_1 routes this data I/O to the destination or real target 206, and VI_2 routes this data I/O to associated appliance 208. This set of virtual entities (DVT, VI_1, and VI_2) may be referred to as a SANTap port 211. Several DVT and VI arrangements are further described below. This SANTap port is just one example of an entity for performing such operations and is not meant to limit the scope of the invention to a specific DVT and VI configuration.

A SANTap port may be configured using any suitable mechanism and/or configured by any suitable entity. Preferably, each appliance is operable to configure a DVT in an appropriate switch as needed for its particular application. In a specific implementation, an appliance causes the switch to set up a DVT by sending a "create" command to the switch. As shown, a control virtual target (CVT) is first set up in the switch for receiving commands from the appliance 208. The appliance 208 specifies to the switch through such CVT various aspects of a specific data tap. The appliance may also specify various other commands for affecting the data tap via its CVT. By way of example, the appliance may issue commands via its CVT to set up a DVT in the switch for a particular initiator and target session, initiate data copying from such session, cease data copying for such session, quiesce, unquiesce, special behaviors, etc. In the illustrated embodiment, appliance 208 specifies through CVT that DVT is to be created so as to tap data flowing between initiator 202 and target 206. Appliance 208 may also stop the data tap through such DVT.

In one embodiment, a session is identified by a specific associated initiator, target, and LUN (or logical units of the target that are accessible by the specific initiator). This set of information uniquely identifies a particular session or flow. In general, each DVT and VI pair created in a switch is configured to direct data from a specific flow to a specific appliance data target (ADT), which may be set up as a virtual target on the appliance side for receiving data (not shown). In one implementation, the initiator or host sets up a session between itself and a specific target and LUN. A copy is made of data received by the relevant DVT that was set up for such session. In the data copy frame, the FCID and LUN of the real target is replaced with the FCID and LUN that is associated with the appliance.

The present invention provides techniques that allow an appliance to read from the specified target of a particular SANTap port, rather than just receive data written to such target by a particular host. In one embodiment, an appliance virtual target (AVT) is associated with a particular SANTap port or DVT so that a READ command sent from the appliance to the AVT results in a READ from the real, associated target. An AVT may be used for any suitable purpose. For example, an AVT is used by an appliance for recovery of itself when it determines that it is out of step with data that was sent to the target. In another application, the appliance may set up an AVT to read from a particular target prior to initiation of a SANTap for such session. That is, the appliance may initialize itself with the target's entire data prior to initiating a data tapping of data that is to be written to such target. Also, the AVT may be set up without ever initiating a SANTap procedure.

As shown in FIG. 2, AVT_1 is set up for SANTap port 211. Once set up, appliance 208 can read from real target 206 through AVT_1. When a READ command is sent to AVT_1 by appliance 208, VI_1 then sends a same type of READ command to the real target 206. When data is then received from the real target 206 by VI_1, such data is then sent from the AVT_1 to the appliance 208.

When an appliance goes out of synchronization with a LUN on the target that it is tapping, the Appliance needs to read data blocks from the target LUN and update itself. However, two issues may make it difficult for the appliance to read this data. The first issue is that the target may have access control (e.g., Host-based LUN Mapping or LUN masking) on a per-initiator basis. For example, a target may be configured so that LUN 1 to 20 are visible to a first initiator and LUN 21 to 40 are visible to a second initiator. The second issue is that the Appliance is preferably placed in a separate VSAN from the target for security purposes. If this preference is followed, then an appliance can read the target LUN only if inter-VSAN routing is set up, which can be a rather complex process. To alleviate both problems, the SANTap mechanism offers the appliance an ability to create AVTs for a specific target and initiator pair. After an AVT is set up for a particular target and host initiator pair, the appliance can issue READ commands to the AVT, and the SANTap port will retrieve the correct data from the target LUN on behalf of the specified host initiator for the appliance. In the example in which a first initiator has access to LUN 1 to 20 of a particular target and a second initiator has access to LUN 21 to 40, two AVTs (one for each initiator) can be set up for the first and second initiators so that the appliance can access all of the LUNs 1 to 40 of the particular target.

Figure 3A:
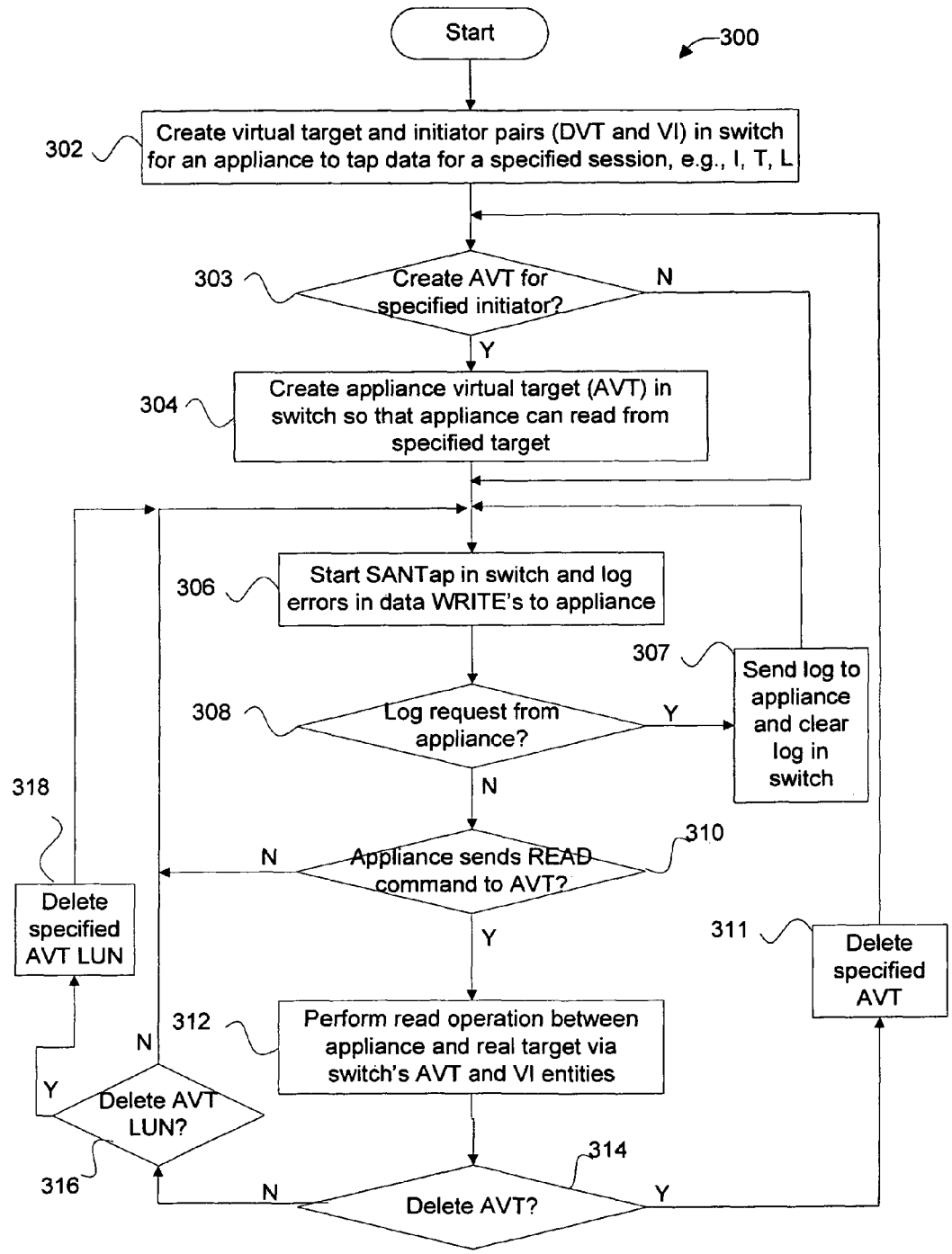
FIG. 3A is a flowchart illustrating a procedure for creating and using an appliance virtual target (AVT) in accordance with one implementation of the present invention.

Any suitable techniques may be utilized to allow an appliance to READ from a particular target. FIG. 3A is a flowchart illustrating a procedure 300 for creating and using an appliance virtual target (AVT) in accordance with one implementation of the present invention. The following procedure illustrates set up of an AVT for a particular session; however, the same general procedure may be practiced for any number of sessions. That is, a first AVT may be set up for a first session, while a second different AVT is set up for a second session. For example, a first AVT may be set up to access a target for a first initiator and a second AVT is set up to access the same target for a second initiator. Also, the following procedure is described in relation to a single appliance causing an AVT to be created for a particular session. However, this procedure can be practiced for any number of appliances which are setting up their own AVTs for the same or different target and initiator pairs.

Referring to FIG. 3A, one or more virtual target and initiator pairs (DVT and VI) may be initially created in each switch for an appliance to tap data for a specified session, e.g., I (initiator), T (target), L (LUN), in operation 302. Several embodiments for setting up a data tap are described further below. It is then determined whether an AVT for the specified initiator is to be created in operation 304. In one implementation, an AVT is to be created upon receipt of an AVT Create Request from an appliance for a particular target and host pair. FIG. 6 includes a number of message types for creation and use of an AVT in accordance with one embodiment of the present invention. An AVT Create Request 602 example is shown as including the following fields: vt_name, avt_san, tgt_vsan, tgt_pwwn, hi_pwwn, vt_pwwn, and vt_nwwn. The vt_name field is an optional text string to be associated with the AVT for display purposes. The avt_vsan field indicates the VSAN where the AVT is to be created, and would normally be the requesting appliance's VSAN.

The tgt_pwwn field indicates the port WWN of the target that the requesting appliance would like to access (using the identity of the host initiator specified in the hi_pwwn field). The hi_pwwn field indicates the port WWN of the host initiator on whose behalf the indicated target is to be accessed. The vt_pwwn and vt_nwwn fields indicate that WWN's for the AVT are to be assigned by the switch when set to a value of 0x00000000000000. Otherwise, if other WWN values are specified in the vt_pwwn and vt_nwwn fields, these specified WWN values are assigned to the AVT. In this later case, it is the appliance's responsibility to ensure global uniqueness of the WWNs.

Figure 3B:
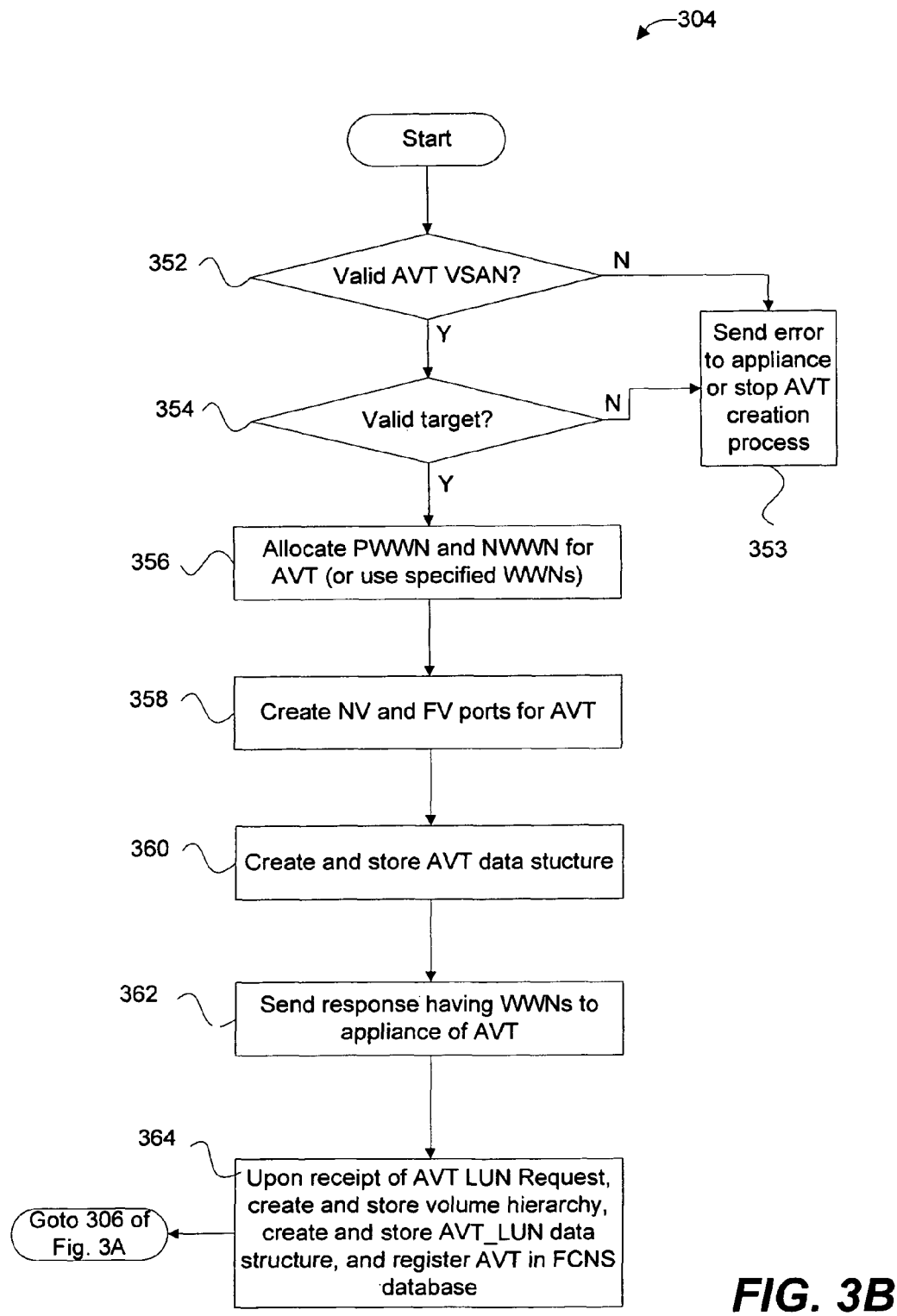
FIG. 3B is a flowchart illustrating the operation of FIG. 3A for creating an AVT in accordance with one embodiment of the present invention.

If it is determined that an AVT is to be created, an appliance virtual target (AVT) is then created in the switch for the appliance to read from the specified target in operation 304. Otherwise, this operation is skipped. Creation of a new AVT may include validation of at least some of the field values specified in the Request, allocation of WWNs to the AVT, creation of appropriate AVT data structures, etc. FIG. 3B is a flowchart illustrating the operation 304 of FIG. 3A for creating an AVT in accordance with one embodiment of the present invention. As shown, it is first determined whether the VSAN in which the AVT is to be created is a valid VSAN in operation 352. If the VSAN of the AVT is valid, it is then determined whether the specified target is valid (e.g., exists) in operation 354. If the VSAN and target are valid, the AVT process continues. Otherwise, an error may be generated and sent to the requesting appliance in operation 353.

A PWWN and NWWN may then be allocated for the AVT (or the WWNs specified in the Request are used) in operation 356. The AVT may then be created based on information specified in the Request and the AVT's allocated (or specified) WWNs. For instance, an NV and FV port may also be created for the AVT in operation 358. An NV and FV port are virtual N and F ports and have similar characteristics as real N and F ports. Several embodiments for forming and using NV and FV ports are further described in U.S. application Ser. No. 10/889,986, entitled VIRTUAL F-PORTS FOR A STORAGE NETWORK, filed 12 Jul. 2004 by Sanjaya Kumar et al., which application is incorporated herein by reference in its entirety for all purposes. In a step 360, an AVT data structure may be formed to relate the NV and FV ports, WWNs and VSAN for the AVT and the WWNs for the target and initiator and this AVT data structure is stored in a persistent data storage.

A response having the WWNs of the AVT may also be sent to the requesting appliance in operation 362. It should be noted that a response may have alternatively been sent when a Request was unsuccessfully validated in operation 353. FIG. 6 illustrates an example AVT Create Response 604 that includes the following fields: status, avt_pwwn, and avt_nwwn. The avt_pwwn and avt_nwwn include the PWWN and NWWN values, respectively, for the new AVT that were allocated by the switch (or specified in the Request). The status field may indicate any suitable status of the AVT creation process, such as whether the AVT was successfully created or the Request failed validation. For example, a response indicating an error may be returned to the appliance in operation 353 if the VSAN or target was determined to be invalid. Otherwise, a response indicating that the AVT was successfully created (and specifying the AVT WWNs) is sent to the appliance in operation 362.

Additionally, the appliance sends an AVT LUN Request to set up at least one LUN for the AVT in the present implementation. An example AVT LUN Request 606 is illustrated in FIG. 6. The AVT LUN Request 606 includes an avt_pwwn field to specify the AVT in which the appliance wishes to create a LUN, an avt_lun field that specifies the LUN on the AVT that the appliance wants to create, and a tgt_lun field that indicates the LUN on the target from which the appliance wants to complete READ I/Os (to the specified AVT LUN).

Upon receipt of the AVT LUN Request, a volume hierarchy and AVT_LUN data structure may be created and stored and the AVT may then be registered in the fibre channel name server (FCNS) database in operation 364 of FIG. 3B. The volume hierarchy generally specifies how the virtual entities associated with the AVT are linked and work together. For example, a READ command sent to the AVT results in a READ command being sent from the VI to the real target. The volume hierarchy will link the associated AVT, VI, and real target and actions for using same. For example, an entry for a particular AVT may include a trigger action for a particular virtual entity (e.g., READ command received at AVT) and the resulting action for another virtual entity (e.g., READ command sent from specified VI to real target). The AVT LUN data structure relates the AVT LUN and the target LUN and links these structures to the associated AVT data structure. Of course, any suitable data structures may be utilized to associate the related parameters of the AVT, AVT LUN, VI, target, and target LUN. The procedure then returns to operation 306 of FIG. 3A. Registration in the FCNS includes obtaining an FCID for the AVT using the WWN of the AVT and then associating and storing the WWN's, FCID, etc. in the FCNS database for later use.

An AVT can be set up during any time in relation to a SANTap for a particular session. For instance, an AVT may be set up prior to initiation of the San Tap process or at any point after initiation of the SANTap process. In either case, the data WRITES to the appliance may be monitored and errors logged so that data recovery can later be implemented by the appliance (e.g., via creating and using an AVT). In the present example, after creation of the AVT, the SANTap is started in the switch and errors are logged for the data WRITES to the appliance in operation 306. If an AVT was not to be created, SANTap and error logging may also commence.

Each data WRITE command issued from a particular host initiator and target includes a handshaking protocol for mirroring such data to the appliance, as well as the real target. FIG. 4 is a communication diagram illustrating a general WRITE handshaking process for writing data between a VI and an appliance. Only a rough sketch of the basic types of message and data that are sent between the VI and appliance are illustrated here so as to simplify the description of the invention. Of course, the handshaking protocol for a data WRITE may include any number and type of messages and data. As shown, a WRITE command is initially sent from the VI to the appliance. After a TXR READY response is received back from the appliance, one or more data blocks may be written from the VI (or host initiator) to the appliance. After the data WRITE's complete, the appliance sends an acknowledgement (ACK) that it received all of the data. A failure in data WRITE handshaking process is logged. For example, if the appliance fails to acknowledge the three different data WRITE sessions, each particular failed WRITE session is logged.

FIG. 5 illustrates an Error Log Table in accordance with one implementation of the present invention. An Error Log Table may be maintained separately for each session or a single Error Log Table may be maintained for all sessions (as illustrated). In the example of FIG. 5 an entry is added to the Log for each failed data WRITE. Each entry specifies at least the LBA_range, LUN, target, and host initiator for the failed data WRITE.

After a SANTap process is initiated and WRITE errors are being logged, it may then be periodically determined whether a request for the error log is received from the appliance in operation 308. For example, the appliance may periodically request the error log for a particular session. If a log request is received, the switch sends the log to the appliance and clears the log in the switch in operation 307. That is, it is assumed that the appliance will do a recovery for the data that was improperly received so these errors no longer have to be tracked by the switch.

It may then be determined whether the appliance has sent a READ command to the AVT in operation 310. In one implementation, the appliance may determine whether an error has occurred in the data WRITEs to itself or to another appliance for which it has taken over data tapping. If data has been unsuccessfully written to the appliance (or another appliance) for any LUNs of the target, the appliance may then recover such data from the target via the AVT. If no READ command is sent to the AVT, the procedure 300 jumps back to operation 306 and continues tapping data. If the appliance sends a READ command to the AVT, a READ operation is then performed between the appliance and the real target via the switch's AVT and VI entities in operation 312. The appliance may continue to read different AVT LUN's as desired to recover any suitable data from the real target.

An appliance has awareness of the AVT's WWN's from the AVT Create Response sent from the switch. The appliance can then obtain the FCID of the AVT from the FCNS database. The appliance sends a READ command to the AVT using the FCID of the AVT as the destination field in the frame and the FCID of the appliance as the source field in the frame. Upon receipt of the READ command at the AVT for a particular LUN, a READ command is sent from the associated VI to the real target, and this READ command has the FCID of the host initiator as the source and the FCID of the real target as the destination. The target's READ data is then received by the VI, and this READ data has the FCID of the real target as the source and the FCID of the host as the destination. The FCID of the appliance is inserted into the source of this READ data frame and the FCID of the AVT is inserted as the destination, and the READ data is forward to the appliance.

It may also periodically be determined whether the AVT should be deleted in operation 314. For example, an AVT Delete Request 608 as illustrated in FIG. 6 may be sent to the switch (e.g., via the CVT), and such Delete Request includes an avt_pwwn field for specifying the AVT to be deleted. Alternatively, it may be determined that an AVT is to be deleted when all of the AVT's LUN's are deleted, for example, by the LUN deletion techniques described further below. If the AVT is to be deleted, the AVT is deleted for the specified initiator in operation 311. AVT deletion may include deletion of the specified AVT's FV and NV ports and AVT data structure. Additionally, the AVT is deregistered from the FCNS database. AVT deletion may also include sending a response to the appliance indicating the status of such deletion. The procedure then jumps back to operation 303 and it is determined whether another AVT is to be created for the specified initiator.

It may also be determined whether one or more AVT LUN are to be deleted in operation 316. That is, the appliance may send a AVT LUN Delete Request 610 as shown in FIG. 6. This AVT LUN Delete Request may include an avt_pwwn field for specifying the AVT in which a LUN is to be deleted and an avt_lun field for indicating the LUN to be deleted. The avt_lun field may specify one or more LUNs of a single AVT. If it is determined that an AVT LUN is to be deleted (e.g., an AVT LUN Delete Request is received via an CVT of the switch), the specified AVT LUN is deleted in operation 318. This deletion process may include any suitable cleanup operations, such as deleting the volume hierarchy and AVT LUN data structure for each specified LUN. The procedure may then continue the SANTap in operation 306.

Embodiments of the present invention allow an appliance to recover data that has been unsuccessfully tapped. That is, the appliance can perform data recovery on the data for a particular session. Embodiments that allow the appliance to utilize the host initiator's identity to recover data eliminates the need to change the target's configuration, such as LUN mapping, access control lists, and LUN masking.

Figure 7A:
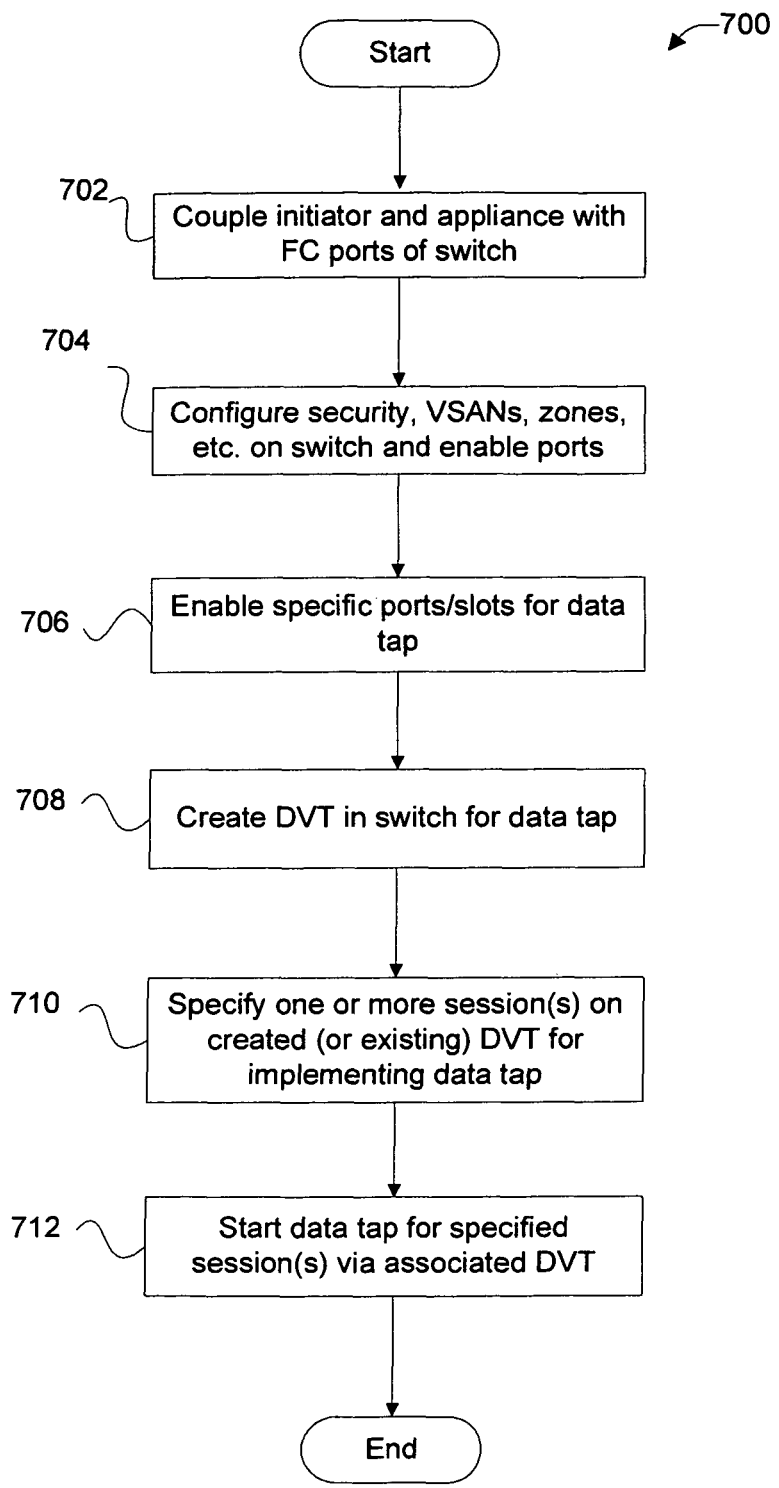
FIG. 7A is a flow chart illustrating a general process for enabling data tapping between a SAN or VSAN initiator and target in accordance with one embodiment of the present invention.

Mechanisms for setting up SANTap's general data tapping feature will now be described. FIG. 7A is a flow chart illustrating a general process 700 for enabling data tapping between a SAN or VSAN initiator and target in accordance with one embodiment of the present invention. This process 700 provides set up of the data tap with minimum disruption. Initially, an initiator and appliance are coupled with ports (e.g., FC ports) on a network device (e.g., switch) in operation 702. This coupling may be direct or indirect. That is, the initiator or appliance may be coupled through one or more other network devices (e.g., switches or routers) as explained further below with respect to different data tapping modes of operation. Additionally, the appliance may access the data tap switch via any suitable network devices, such as other switches and/or routers. Of course, the initiator and appliance may also have access to other switches that serve the same target (e.g., a redundant switch). In this example, it is assumed that the targets or storage devices are already coupled with the switch.

Security, VSANs, zones, etc. may next be configured and the ports enabled on the data tap switch in operation 704. For example, the switch may be configured with an SNMP username and password to allow access to the switch by users. VSAN groups and zones may also be configured on the switch for each port/slot, for example. Specific ports/slots of the data tap switch may then be enabled for a data tap in operation 706. That is, particular ports and/or slots may be designated as allowing data tapping, while others are designated as not allowing data tapping. These switch configurations may be configured by any suitable entity, such as an administrator or software agent.

A DVT (and VI) may then be created on an enabled port/slot of the switch for implementing the data tap feature in operation 708. One or more session(s) may then be specified for the created DVT (and VI) for implementing the data tap in operation 710. Several techniques for creating a DVT and VI are further described below. In one implementation, an appliance specifies that a DVT is to be created for a particular target and then the switch automatically creates such DVT and corresponding VI. The data tap may then be initiated for one or more sessions (e.g., specified by the appliance) in operation 712, and the procedure for starting a data tap then ends.

A DVT (and VI) may take any suitable form for facilitating the data tap between an initiator and target. Three modes are described herein: proxy mode 1, proxy mode 2, and transparent mode. Each of these modes has its own associated advantages, as well as disadvantages. Each of these modes uses different identities for the DVT, where each identity is in the form of a World Wide Name (WWN) and Fibre Channel Network Identifier (FCID). Within a Fibre Channel network, all Fibre Channel devices have a World Wide Name (WWN). More specifically, a Node WWN (NWWN) is the WWN of the node that is connected to a particular port. In other words, the NWWN is the WWN of the system, storage device, or subsystem that is connected to the switch port. In addition to a Node WWN, a Port WWN (PWWN) serves as a given name for a particular port (FWWN for a particular fiber port). A Fibre Channel network ID (FCID) for the particular switch port is used to identify the physical location of a port. Each Fibre Channel device may have multiple ports, each of which is uniquely identified by a NWWN and a PWWN. In the following description, PWWN or NWWN may be used interchangeably with the shortened identifier "WWN."

In the proxy mode 1, the DVT gets a new PWWN and a new FCID. This arrangement allows the initiator and target to sit anywhere in the network and not be directly coupled to a port of the switch on which resides the DVT. That is, the DVT may reside anywhere in the network with respect to the initiator and target. When the initiator sends data to the DVT, the routing protocol will then work to forward the data to the DVT wherever it resides. When the data reaches the DVT, the routing then handles forwarding the data to the target and appliance (e.g., via a VI associated with the DVT).

Figure 7B:
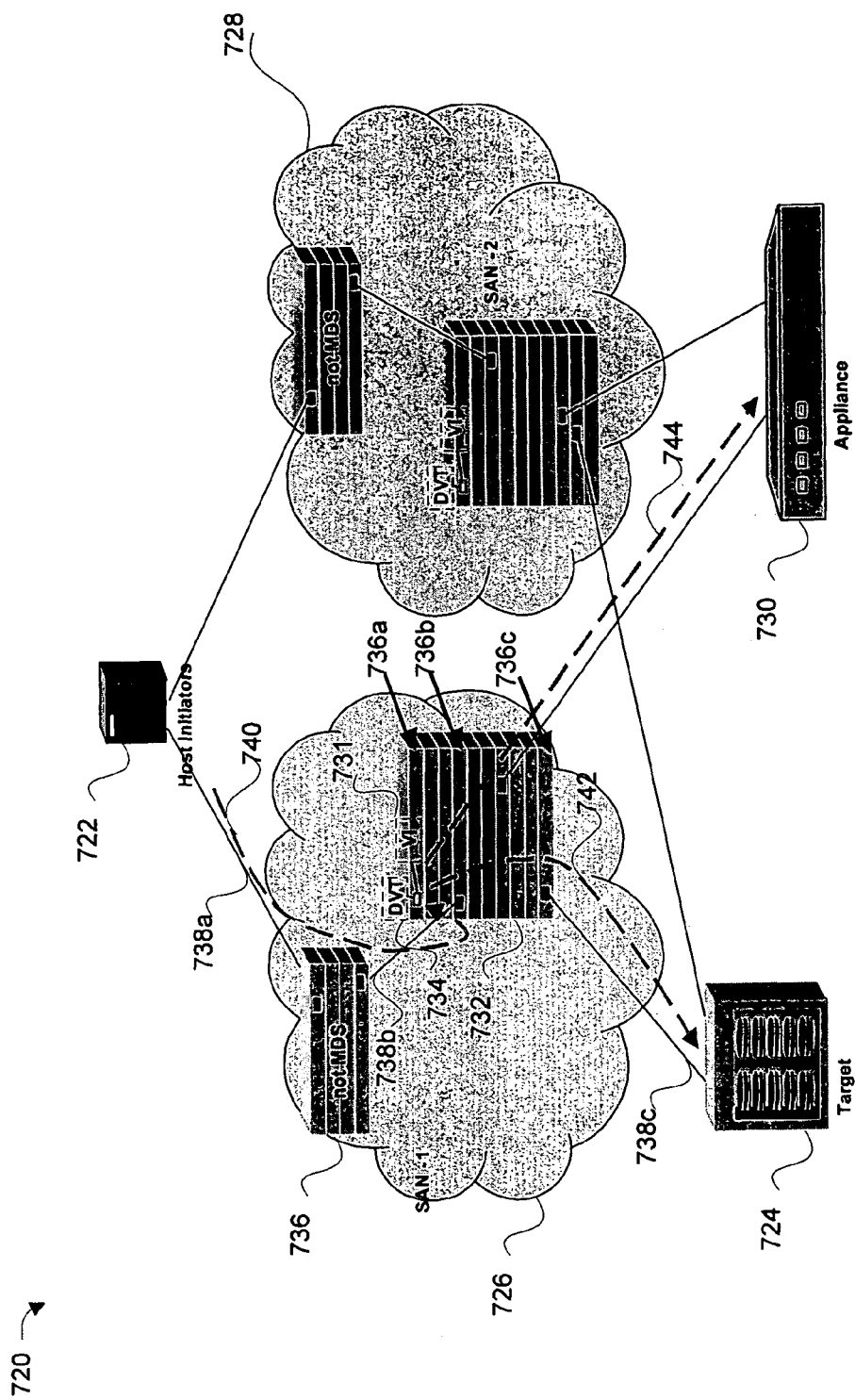
FIG. 7B illustrates a data tapping configuration in a first proxy mode (proxy mode 1) of operation in accordance with a first implementation of the present invention.

FIG. 7B illustrates a data tapping configuration in a first proxy mode (proxy mode 1) of operation in accordance with a first implementation of the present invention. As shown, a host initiator 722 is coupled to a non-MDS switch 736 that is not configurable with a DVT. The non-MDS switch 736 is itself coupled to an MDS switch 732 on which resides a DVT 734. The MDS switch 732 is coupled to a target 724. The devices in the path between the initiator and the target represent a first SAN 726. Also shown is a redundant path between the initiator 722 through a second SAN 728. Either path may be used by initiator 722, depending on which path is active or failing.

Since the DVT has a unique PWWN and FCID, the DVT 734 can be positioned in a different path than the path that is between the initiator 722 and the target 724 and data can still be routed properly from the initiator to the DVT and then to the target. Also, the path between the initiator and target may contain non-MDS switches that simply are configured to route data to ports or nodes having unique PWWN and FCID pairs and do not have to be configured to implement MDS functions such as VSAN groups.

As shown for the first SAN 726, the DVT 734 and VI 731 reside on a different intelligent line card in the MDS switch 732 than the ports which are coupled directly to the non-MDS switch 736 (and indirectly the initiator) and target 724. That is, the initiator 722 is coupled to a port on the non-MDS switch 736 via path 738a; the non-MDS switch 736 is then coupled directly to a port of line card 736b of MDS switch 732 via path 738b; and a port the MDS switch 732 on line card 736c is coupled directly to the target via path 738c. In contrast, the DVT 734 is in the form of a port that resides on line card 736a. Data can be routed from the initiator to the target 724 through paths 740 and 742. The data or a copy of the data is also routed via path 744 to appliance 730. A standard routing protocol is used to accomplish these data routes.

Of course in this implementation, the initiator 722 needs to obtain the new PWWN and new FCID of the DVT. In this case, when the DVT is created in the switch, the initiator is not aware of the new FCID or new PWWN. That is, the initiator 722 is only aware of the PWWN and FCID that were obtained from the switch in its initial login procedure to the switch 732 port. The initiator needs to know the new FCID and PWWN of the new target DVT in order to access the new target (i.e., DVT). Also, many current implementations do not make use of mechanisms for initiators to automatically learn about new available targets (i.e., DVT). Instead, files are typically manually created on a host to tell it what targets it must use. Thus, under current protocols the initiator's configuration is changed so that the new PWWN and new FCID of a new DVT are provided to the associated initiator 722. In one implementation, an administrator may configure these identifies (e.g., PWWN and FCID of the DVT) in the initiator 722 after a new DVT is set up. More typically, the initiator is configured with the new PWWN and obtains the new FCID by a new login procedure to the name server using the PWWN of the target. Mappings between the DVT and both the real target and appliance are also set up in the switch to facilitate routing and data tapping.

Perhaps in future protocol versions when mechanisms are universally implemented to automatically inform the initiator of new targets, the initiators will never have to be manually configured. Since under the present protocol the initiator needs to be configured with the new PWWN and FCID, this mode is disruptive and data exchange between the initiator and DVT cannot commence until reconfiguration is complete.

Figure 7C:
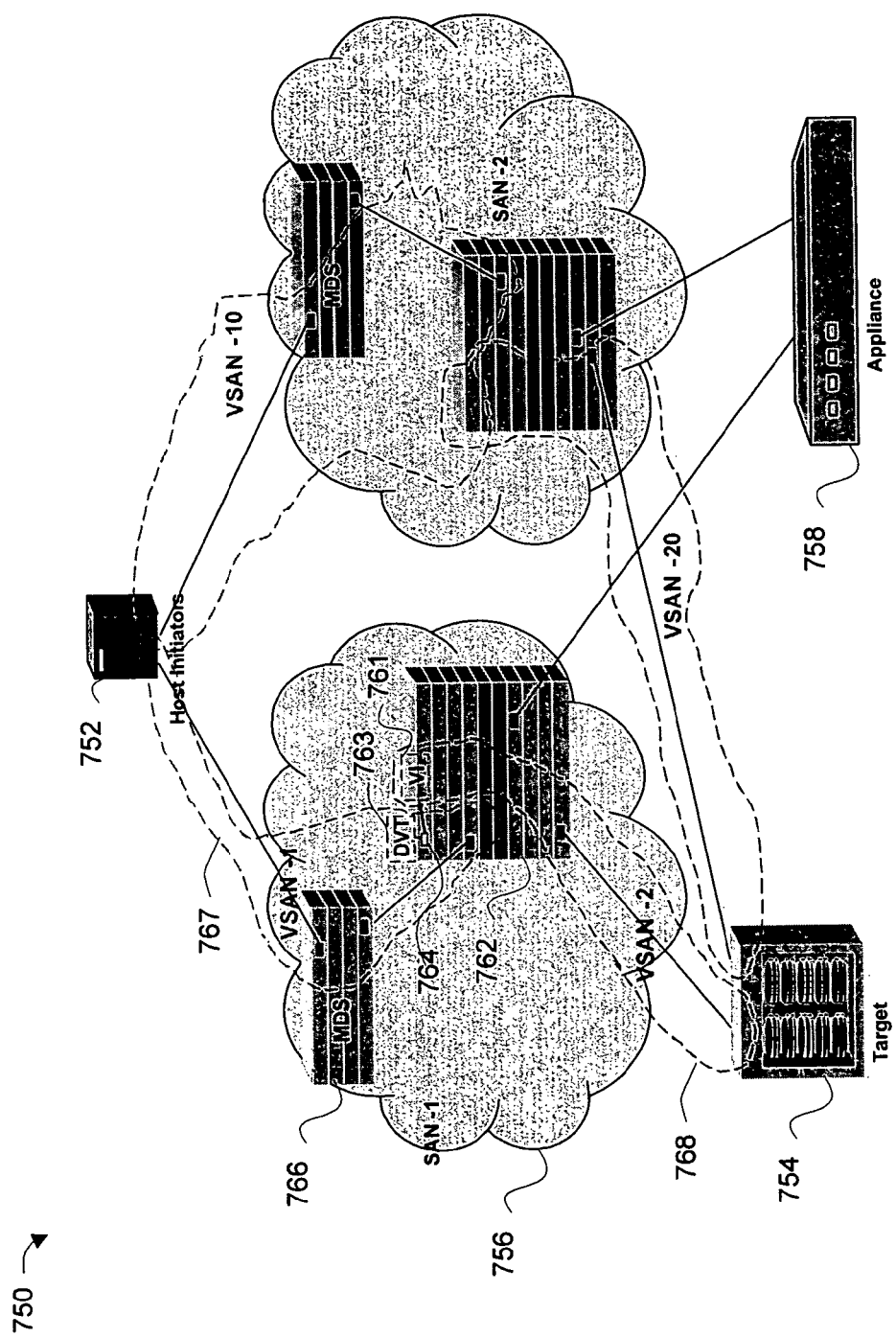
FIG. 7C illustrates a data tapping configuration in a second proxy mode (proxy mode 2) of operation in accordance with a second implementation of the present invention.

FIG. 7C illustrates a data tapping configuration in a second proxy mode (proxy mode 2) of operation in accordance with a second implementation of the present invention. In this mode, the DVT has the same PWWN as the corresponding target and a new FCID that differs from the target's FCID. In this mode, the initiator does not have to be reconfigured with the PWWN of the target. In one implementation of the Fibre Channel protocol, the initiator can use this same PWN of the original target to then log in to get the new FCID of the new DVT. For instance, the initiator disconnects and reconnects to the switch (or the data tap service sends a disconnect to the initiator which would result in an automatic reconnect) to perform an initialization procedure so as to obtain the new FCID of the new DVT. Alternatively, the initiator can accomplish the same thing by performing a software restart.

In a current implementation (and perhaps future implementations) of Fibre Channel protocol, the same target cannot have a same PWWN unless they reside in different VSANs. Thus, DVT belongs to a first VSAN 767, while the original target and target port belong to a second different VSAN 768. Another entity referred to as a virtual initiator (VI) 761 may also be used to log into the target to obtain identification information (e.g., FCID) of the target and then to route data received at the DVT 764 from itself in its role as an initiator to the target 754. In this implementation, the VI 761 belongs to the same VSAN 768 as the target 754. If there are any switches present between the initiator and the switch that is implementing the DVT, the intervening switches have to be configurable with a particular VSAN. That is, an intervening switch between the initiator and the DVT switch has to be configured with the same VSAN as the DVT. In the illustrated embodiment, a MDS switch 766 is present between the initiator 752 and the switch 762 having the DVT 763 although any suitable switch that implements VSANs may be utilized. Likewise, any intervening switch positioned between the switch 762 having the DVT 763 and VI 761 and the target 754 needs to be configurable with a particular VSAN (not shown). That is, an intervening switch between the initiator and the DVT (or VI) switch has the same VSAN as the VI. The intervening switch also allows traffic for its own VSAN.

In both proxy modes 1 and 2, the VI uses a different FCID then the DVT. In the proxy mode 2, the VI also uses different FCIDs when sending data to the real target and the appliance, while in proxy mode 1 the VI uses the same FCID. In a specific proxy mode 2 implementation, two VIs are used: one to write to the real target and the other to write to the appliance. These two VIs have different FCIDs and different WWNs. The reason that the DVT and VIs have different FCIDs in proxy mode 2 is that the VIs are sending data to different VSANs when they are sending data to the appliance and the target. That is, the appliance is either in the same VSAN as the initiator or the target, but not both. The Appliance could also be in a third VSAN which is neither the initiator VSAN nor the target VSAN. Thus, the VIs must have a unique identity in each VSAN in order to send data to each VSAN.

Both of the proxy modes 1 and 2 require some reconfiguration and/or re-initialization of the initiator to obtain a new PWWN and/or new FCID of the new DVT. Another mode that does not require any reconfiguration or re-initialization of the initiator is referred to as a "transparent mode." The transparent mode includes setting up a new DVT that has a same PWWN and same FCID as the original target. In other words, creation of a new DVT (and VI) between the initiator and original target does not cause any disruption in the communication between the initiator and original target. Once the DVT is set up, data flows seamlessly between the initiator and original target without any changes from the initiator's or the target's side. Advantageously, the initiator does not have to be informed about the new DVT, but can simply continue sending data to the original target before, during, and after creation of a new DVT without disruption.

In this implementation, the DVT and its associated VI can merely serve as software entities and do not require any physical manifestation. That is, the new DVT does not have to be advertised to the devices outside the switch as an available physical target. The initiators do not have to become aware of the new DVT. The DVT and VI can merely serve as entities that perform the data tapping between the initiator and the real target.

Figure 7D:
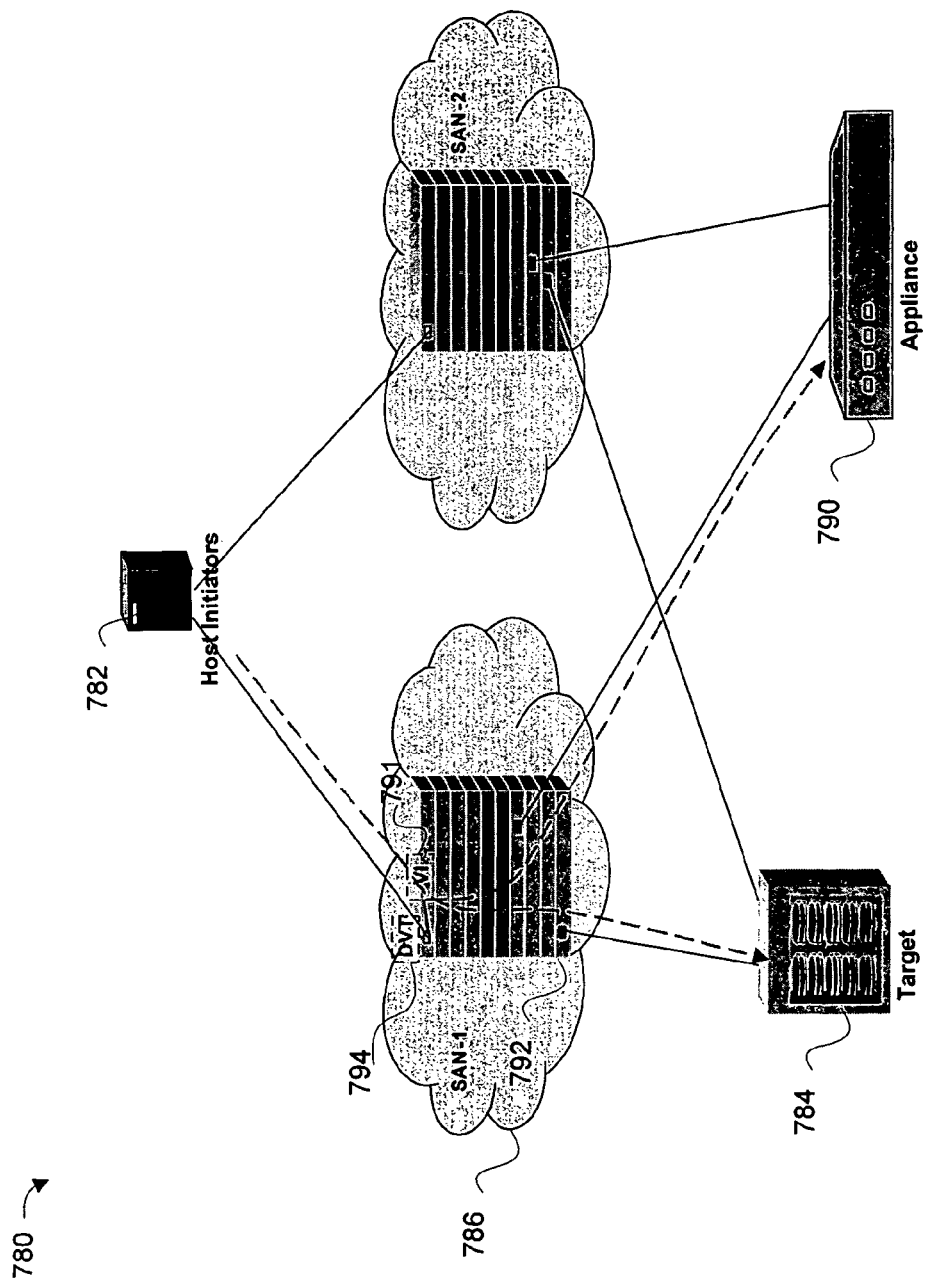
FIG. 7D is a diagrammatic representation of an example data tapping configuration in a transparent mode in accordance with a third implementation of the present invention.

FIG. 7D is a diagrammatic representation of an example data tapping configuration in a transparent mode in accordance with a third implementation of the present invention. As shown, an initiator 782 is coupled with switch 792 of SAN 786. The switch 792 is coupled with a target 784 and an appliance 790. When a DVT 794 having the same PWWN and FCID as the target 784 is created in the switch, data is, in effect, routed from the initiator 782 to the DVT 794. A virtual initiator (VI) 791 then routes the data received by the DVT to both the target 784 and the corresponding appliance 790. In a sense, the DVT can be said to merely snoop the traffic going from the initiator to the target. The DVT identifies traffic going between the initiator and target and copies such identified data. This copied data is then routed to the appliance 784.

In this implementation, the DVT needs to be placed in the routing path between the initiator and the target so as to ensure that the DVT receives the data sent between the initiator and target. Thus, in the illustrated implementation, the initiator and target are both coupled directly to the switch although only one of these devices needs to be connected directly to the switch that contains the data tapping DVT for such devices.

For all three modes relationships between the new DVT, initiator, original target, and appliance are also retained or set up in the switch. In one implementation, mappings between the connected entities are generated in the switch to thereby facilitate routing between the initiator and the new DVT, between the new DVT (and new VI) and the original target, and between the new DVT (and VI) and appliance, as well as the data tapping features for sending data from the DVT to both the original target and the corresponding appliance. VSAN and zoning may also be setup for each new DVT and VI pair. Several embodiments for creating a virtual port and their associated mappings are further described in co-pending U.S. Patent Applications (1) application Ser. No. 10/056,238 entitled "METHODS AND APPARATUS FOR IMPLEMENTING VIRTUALIZATION OF STORAGE WITHIN A STORAGE AREA NETWORK" filed 23 Jan. 2002 by Thomas James Edsall et al. and (2) application Ser. No. 10/045,883 entitled "METHODS AND APPARATUS FOR IMPLEMENTING VIRTUALIZATION OF STORAGE WITHIN A STORAGE AREA NETWORK THROUGH A VIRTUAL ENCLOSURE" filed 9 Jan. 2002 by Sanjaya Kumar et al., which applications are herein incorporated by reference in their entirety for all purposes.

Figure 8:
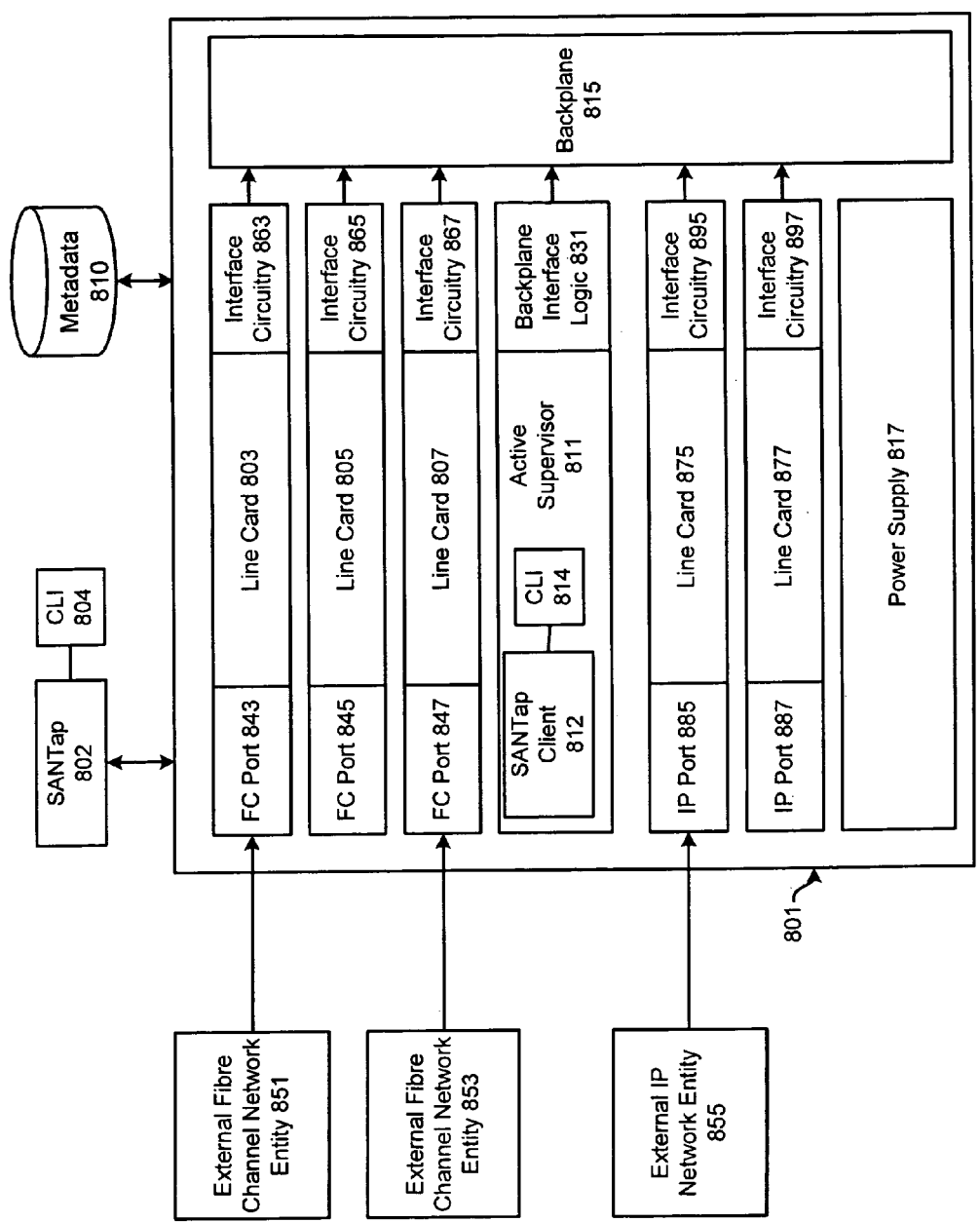
FIG. 8 is a diagrammatic representation of one example of a fibre channel switch that can be used to implement techniques of the present invention.

FIG. 8 is a diagrammatic representation of one example of a fibre channel switch 801 that can be used to implement techniques of the present invention. Although one particular configuration will be described, it should be noted that a wide variety of switch and router configurations are available. The switch 801 may include, for example, at least one interface for communicating with one or more SANTap(s) 802. In at least one implementation, the SANTap 802 may reside external to the switch 801, and may also be accessed via a command line interface (CLI) 804. The switch 801 may include at least one interface for accessing external metadata information 810.

The switch 801 may include one or more supervisors 811 and power supply 817. According to various embodiments, the supervisor 811 has its own processor, memory, and/or storage resources. Additionally, the supervisor 811 may also include one or more SANTap clients (e.g., SANTap client 812) which may be adapted, for example, for facilitating communication between the SANTap 802 and the switch. The supervisor's SANTap clients may also each be accessed via a command line interface (CLI), e.g., 814.

Figure 9:
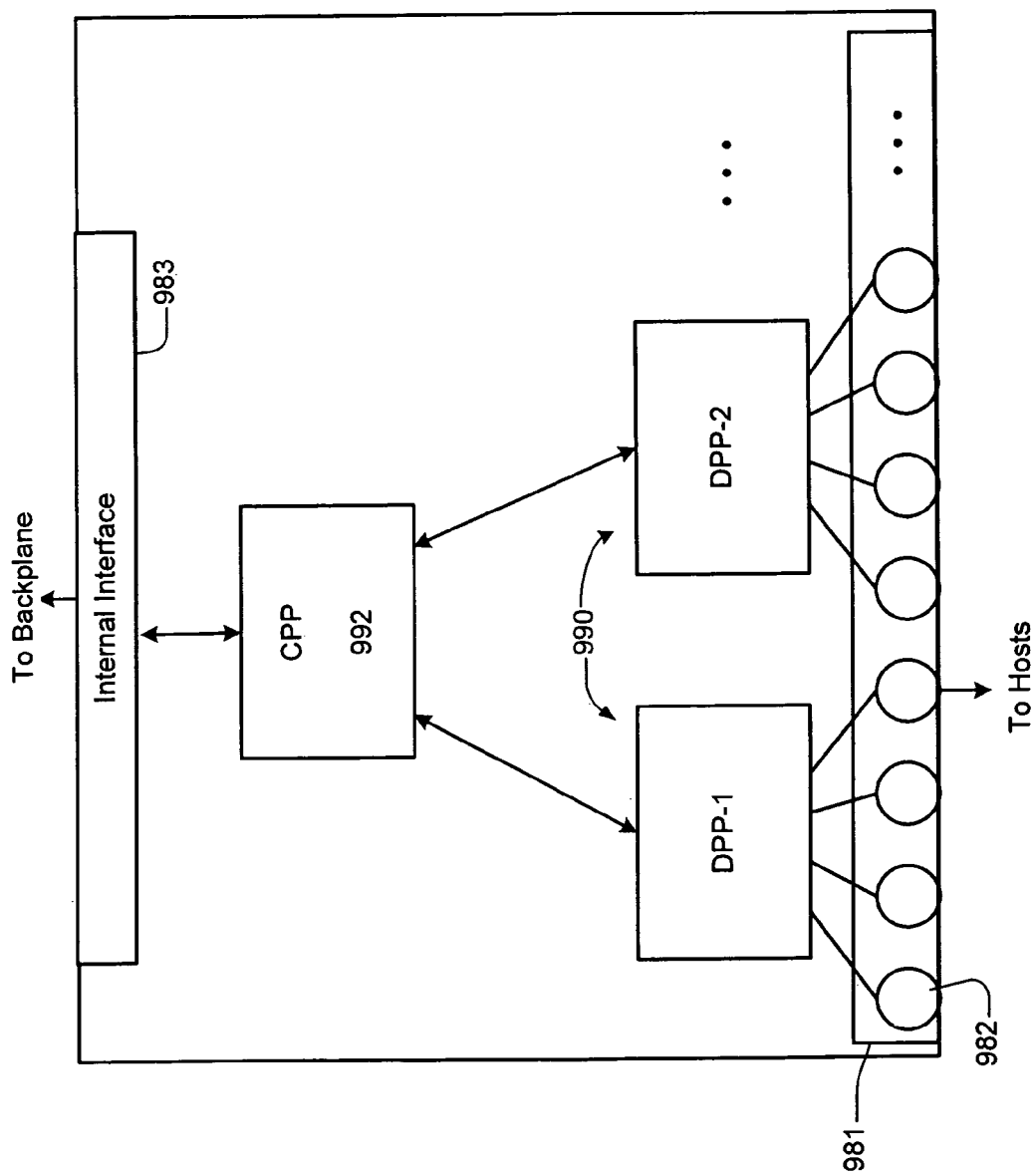
FIG. 9 is a block diagram illustrating a portion of an exemplary switch or intelligent line card in which various embodiments of the present invention may be implemented.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. An example of at least a portion of a line card is illustrated in FIG. 9 of the drawings.

The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, port manager, FLOGI server, utility applications, etc. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

FIG. 9 is a block diagram illustrating a portion of an exemplary switch or intelligent line card in which various embodiments of the present invention may be implemented. According to a specific embodiment, switch portion 980 of FIG. 9 may be implemented as one of a plurality of line cards residing in a fibre channel switch such as that illustrated in FIG. 8, for example. In at least one implementation, switch portion 980 may include a plurality of different components such as, for example, at least one external interface 981, at least one data path processor (DPP) 990, at least one control path processor (CPP) 992, at least one internal interface 983, etc.

As shown in the example of FIG. 9 the external interface of 981 may include a plurality of ports 982 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 982 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 9, switch portion 980 may also include a control path processor (CPP) 992 configured or designed to perform control path processing for storage virtualization. In at least one implementation, functions performed by the control path processor may include, for example, calculating or generating virtual-to-physical (V2P) mappings, processing of port login and process login for volumes; communicating with name server(s); etc.

Although the foregoing invention has been described in some detail for purposes of clarity of understanding, it will be apparent that certain changes and modifications may be practiced within the scope of the appended claims. For example, although a DVT is described as tapping data for one or more specific sessions, of course, the DVT data tapping may be configured to tap all data for a specific target or specific LUN of a target, etc. Therefore, the described embodiments should be taken as illustrative and not restrictive, and the invention should not be limited to the details given herein but should be defined by the following claims and their full scope of equivalents.

What is claimed is:

1. A method of recovering data from a data writing process in a storage area network (SAN), the method comprising:
   at a SAN switch, providing a first data writing mechanism for a first host to write first SAN data to a storage device; and
   at the SAN switch, setting up a first data recovery mechanism that is associated with the first data writing mechanism whereby the first data recovery mechanism is set up to receive a query from an appliance, in response to the first SAN data being unsuccessfully mirrored to the appliance during data tapping, to read and recover the first SAN data and in response to such query provide the first SAN data to the appliance;
   wherein setting up the first data recovery mechanism includes:
      setting up a first appliance virtual target (AVT) for reading the first SAN data by the appliance from the storage device, wherein the first AVT is set up in the SAN switch, which receives the first SAN data; and
      registering the first AVT with a name server database.

2. A method as recited in claim 1, further comprising:
   when the appliance sends a READ command to the first AVT for reading a first portion of the first SAN data, sending, from the SAN switch to the storage device, a READ command for reading the first portion of the first SAN data and directing the first portion of the SAN data that is sent from the storage device to the appliance.

3. A method as recited in claim 1, wherein the first data writing mechanism provides a data virtual target (DVT) at the SAN switch for receiving the first SAN data and a virtual initiator (VI) at the SAN switch for sending the first SAN data that is received at the DVT to the storage device, and wherein a READ command for the first SAN data is sent from the VI to the storage device when a READ command for the first SAN data is received at the first AVT from the appliance.

4. A method as recited in claim 3, wherein the READ command sent from the VI to the storage device includes a source field that specifies the first host as being the source of the READ command for the first SAN data.

5. A method as recited in claim 4, further comprising:
   at the SAN switch, providing a second data writing mechanism for a second host to write second SAN data to the storage device,
   at the SAN switch, setting up a second data recovery mechanism that is associated with the second data writing mechanism whereby the first data recovery mechanism is set up to receive a query from an appliance to read and recover the first SAN data and in response to such query provide the first SAN data to the appliance, wherein setting up the second data recovery mechanism is accomplished by:
      setting up a second appliance virtual target (AVT) for reading the second SAN data from the storage device, wherein the second AVT is set up in the SAN switch, which receives the second SAN data; and
   when the appliance sends a READ command to the second AVT for reading a first portion of the second SAN data, sending, from the SAN switch to the storage device, a READ command for reading the first portion of the second SAN data and directing the first portion of the second SAN data that is sent from the storage device to the appliance.

6. A method as recited in claim 5, wherein the second data writing mechanism provides a second data virtual target (DVT) at the SAN switch for receiving the second SAN data and a second virtual initiator (VI) at the SAN switch for sending the second SAN data that is received at the second DVT to the storage device, and wherein a READ command for the second SAN data is sent from the second VI to the storage device when a READ command for the second SAN data is received at the second AVT from the appliance.

7. A method as recited in claim 6, wherein the READ command sent from the second VI to the storage device includes a source field that specifies the second host as being the source of the READ command for the second SAN data.

8. A method as recited in claim 5, wherein the first portion of the first SAN data is a different logical unit of the storage device than the first portion of the second SAN data.

9. A method as recited in claim 1, wherein setting up the first recovery mechanism includes (i) assigning a port and device world wide name (PWWN and NWWN) to the first AVT, and (ii) forming and storing an AVT data structure to relate an FV and NV port of the first AVT, the PWWN and NWWN of the first AVT, and VSAN of the first AVT whereby an fibre channel identifier (FCID) is assigned and related to the PWWN and NWWN of the first AVT.

10. A method as recited in claim 9, further comprising sending a response having the PWWN and NWWN of the first AVT to the appliance.

11. A method as recited in claim 10, wherein a READ command sent to the first AVT uses the FCID of the first AVT as a source and a READ command sent to the storage device in response to a READ command to the first AVT includes an FCID for the first host.

12. A method as recited in claim 1, wherein the first data writing mechanism includes logging errors for the first SAN data being received by the appliance, the method further comprising sending the logged errors for the first SAN data to the appliance.

13. The method of claim 1, wherein setting up the first AVT is initiated by the appliance.

14. The method of claim 1, wherein the setting up the first data recovery mechanism is performed in response to a command received from the appliance.

15. An apparatus for recovering data from a data writing process in a storage area network (SAN), wherein the apparatus is in the form of a SAN switch comprising:
one or more processors;
one or more memory, wherein at least one of the processors and memory are adapted for:
at the SAN switch, providing a first data writing mechanism for a first host to write first SAN data to a storage device; and
at the SAN switch, setting up a first data recovery mechanism that is associated with the first data writing mechanism whereby the first data recovery mechanism is set up to receive a query from an appliance, in response to the first SAN data being unsuccessfully mirrored to the appliance during data tapping, to read and recover the first SAN data and in response to such query provide the first SAN data to the appliance;
wherein setting up the first data recovery mechanism includes setting up a first appliance virtual target (AVT) for reading the first SAN data by the appliance from the storage device, wherein the first AVT is set up in the SAN switch, which receives the first SAN data; and
registering the first AVT with a name server database.

16. An apparatus as recited in claim 15, wherein at least one of the processors and memory are further adapted for:
when the appliance sends a READ command to the first AVT for reading a first portion of the first SAN data, sending, from the SAN switch to the storage device, a READ command for reading the first portion of the first SAN data and directing the first portion of the SAN data that is sent from the storage device to the appliance.

17. An apparatus as recited in claim 16, wherein the first data writing mechanism provides a data virtual target (DVT) at the SAN switch for receiving the first SAN data and a virtual initiator (VI) at the SAN switch for sending the first SAN data that is received at the DVT to the storage device, and wherein a READ command for the first SAN data is sent from the VI to the storage device when a READ command for the first SAN data is received at the first AVT from the appliance.

18. An apparatus as recited in claim 17, wherein the READ command sent from the VI to the storage device includes a source field that specifies the first host as being the source of the READ command for the first SAN data.

19. An apparatus as recited in claim 18, wherein at least one of the processors and memory are further adapted for:
at the SAN switch, providing a second data writing mechanism for a second host to write second SAN data to the storage device,
at the SAN switch, setting up a second data recovery mechanism that is associated with the second data writing mechanism whereby the first data recovery mechanism is set up to receive a query from an appliance to read and recover the first SAN data and in response to such query provide the first SAN data to the appliance, wherein setting up the second data recovery mechanism is accomplished by:
setting up a second appliance virtual target (AVT) for reading the second SAN data from the storage device, wherein the second AVT is set p in the SAN switch, which receives the second SAN data; and
when the appliance sends a READ command to the second AVT for reading a first portion of the second SAN data, sending, from the SAN switch to the storage device, a READ command for reading the first portion of the second SAN data and directing the first portion of the second SAN data that is sent from the storage device to the appliance.

20. An apparatus as recited in claim 19, wherein the second data writing mechanism provides a second data virtual target (DVT) at the SAN switch for receiving the second SAN data and a second virtual initiator (VI) at the SAN switch for sending the second SAN data that is received at the second DVT to the storage device, and wherein a READ command for the second SAN data is sent from the second VI to the storage device when a READ command for the second SAN data is received at the second AVT from the appliance.

21. An apparatus as recited in claim 20, wherein the READ command sent from the second VI to the storage device includes a source field that specifies the second host as being the source of the READ command for the first SAN data.

22. An apparatus as recited in claim 19, wherein the first portion of the first SAN data is a different logical unit of the storage device than the first portion of the second SAN data.

23. An apparatus as recited in claim 16, wherein setting up the first recovery mechanism includes (i) assigning a port and device world wide name (PWWN and NWWN) to the AVT, and (ii) forming and storing an AVT data structure to relate an FV and NV port of the first AVT, the PWWN and NWWN of the first AVT, and VSAN of the first AVT whereby an fibre channel identifier (FCID) is assigned and related to the PWWN and NWWN of the first AVT.

24. An apparatus as recited in claim 23, wherein at least one of the processors and memory are further adapted for sending a response having the PWWN and NWWN of the first AVT to the appliance.

25. An apparatus for recovering data from a data writing process in a storage area network (SAN), wherein the apparatus is in the form of a SAN switch comprising:
means for providing at the SAN switch a first data writing mechanism for a first host to write first SAN data to a storage device; and
means for setting up a first data recovery mechanism that is associated with the first data writing mechanism whereby the first data recovery mechanism is set up to receive a query from an appliance, in response to the first SAN data being unsuccessfully mirrored to the appliance during data tapping, to read and recover the first SAN data and in response to such query provide the first SAN data to the appliance, wherein setting up the first data recovery mechanism includes:
setting up a first appliance virtual target (AVT) for reading the first SAN data by the appliance from the storage device, wherein the first AVT is set up in the SAN switch, which receives the first SAN data; and
registering the first AVT with a name server database.

26. A system for recovering data from a data tapping process in a storage area network (SAN), comprising:
  a first host;
  a storage device for storing data;
  an appliance for tapping data in the SAN;
  a SAN switch in the SAN operable to:
    at the SAN switch, provide a data tapping mechanism for the appliance to receive first SAN data as it is being sent from the first host to the storage device; and
    at the SAN switch, set up a data recovery mechanism that is associated with the first data tapping mechanism whereby the first data recovery mechanism is set up to receive a query from the appliance, in response to the first SAN data being unsuccessfully mirrored to the appliance during data tapping, to recover the first SAN data and in response to such query provide the first SAN data to the appliance, wherein setting up the first data recovery mechanism includes:
      setting up a first appliance virtual target (AVT) for reading the first SAN data by the appliance from the storage device, wherein the first AVT is set up in the SAN switch, which receives the first SAN data;
      wherein setting up the first AVT is performed in response to a command received from the appliance;
    wherein the appliance is configured to recover one or more portions of the first SAN data via the data recovery mechanism of the SAN switch when the one or more portions are unsuccessfully received by the appliance via the data tapping mechanism of the SAN switch.

\* \* \* \* \*